(12) United States Patent
Nagel et al.

(10) Patent No.: US 9,310,274 B2
(45) Date of Patent: *Apr. 12, 2016

(54) SYSTEM AND METHOD FOR MEASURING FIBER TEMPERATURE USING OTDR MEASUREMENTS

(71) Applicant: AT & T Intellectual Property I, L.P., Atlanta, GA (US)

(72) Inventors: Jonathan Nagel, Brooklyn, NY (US); Sheryl Woodward, Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 502 days.

This patent is subject to a terminal disclaimer.

(21) Appl. No.: 13/859,839

(22) Filed: Apr. 10, 2013

(65) Prior Publication Data

US 2014/0139824 A1     May 22, 2014

Related U.S. Application Data

(63) Continuation of application No. 12/916,982, filed on Nov. 1, 2010, now Pat. No. 8,428,902.

(51) Int. Cl.
*G06F 19/00* (2011.01)
*G01M 11/00* (2006.01)
*G01K 3/14* (2006.01)
*G01K 11/32* (2006.01)

(52) U.S. Cl.
CPC .............. *G01M 11/3145* (2013.01); *G01K 3/14* (2013.01); *G01K 11/32* (2013.01); *G01M 11/3109* (2013.01); *G01M 11/3136* (2013.01)

(58) Field of Classification Search
CPC ................... A61B 2019/2211; A61B 19/2203; G01S 7/484; G01L 1/242
USPC ........................................ 702/130, 182–185
See application file for complete search history.

(56) References Cited

U.S. PATENT DOCUMENTS

2008/0221814 A1* 9/2008 Trainer ................. G01B 11/08 702/70
2009/0075391 A1* 3/2009 Fulghum, Jr. ...... A61B 1/00165 436/164

* cited by examiner

*Primary Examiner* — Edward Raymond
(74) *Attorney, Agent, or Firm* — Fay Kaplun & Marcin, LLP

(57) ABSTRACT

Systems and methods for calculating a relative temperature of a fiber-optic cable using bi-directional analysis traces with an optical time-domain reflectometer ("OTDR"). Analysis of bi-directional traces along a length of fiber-optic cable yields a scaled local backscatter coefficient of the fiber. Accordingly, an initial set of measurement data is collected at a first time interval and a base scaled local backscatter along a fiber is calculated. A subsequent set of measurement data is collected at a second time interval and a subsequent scaled local backscatter along the fiber is calculated. The exemplary systems and methods described herein determines a change in scaled local backscatter as a function of a difference between the base scaled local backscatter and at least the subsequent scaled local scaled local backscatter along the fiber, and then determines a relative temperature variation of the fiber as a function of the change in scaled local backscatter.

21 Claims, 5 Drawing Sheets

FIG. 5  Graph 501

Scaled Backscatter Function vs. Estimated Temperature
(30 km from start of fiber)

SYSTEM AND METHOD FOR MEASURING FIBER TEMPERATURE USING OTDR MEASUREMENTS

PRIORITY CLAIM

This application is a Continuation application of U.S. patent application Ser. No. 12/916,982, now U.S. Pat. No. 8,428,902, issued on Apr. 23, 2013 filed on Nov. 1, 2010 entitled "System and Method for Measuring Fiber Temperatures Using OTDR Measurements". The entire disclosure of this prior application is considered as being part of the disclosure of the accompanying applications and hereby expressly incorporated by reference herein.

BACKGROUND

An optical time-domain reflectometer ("OTDR") is an opto-electronic instrument used to characterize an optical fiber. A typical OTDR injects a series of optical pulses into the fiber during a testing process. From the same end of the fiber, the OTDR also extracts light that is scattered and reflected back from points in the fiber due to irregularities in the optical fiber structure. This process is equivalent to the manner in which an electronic time-domain reflectometer may measure reflections caused by changes in the impedance of the cable under test. Accordingly, the strength of the back-reflected light is measured as a function of time, and is plotted as a function of fiber length.

OTDRs have conventionally been standard equipment for the characterization of optical fiber. Specifically, it is well known that by transmitting a pulse down a fiber and analyzing the back-reflected light, the loss of the fiber may then be characterized. OTDRs may characterize the loss and length of an examined fiber during manufacture, during warehousing, during installation, and during splicing. OTDRs are also used to locate faults in the fiber, such as breaks. Faults or failures in the fiber may be costly, in terms of repairing the fiber, as well as any adverse affects in service (e.g., disruption or loss of service). Any ability for measuring the temperature of fibers requires more sensitivity and more expensive devices and components than a standard OTDR. Specifically, measurements of fiber temperature typically rely on non-linearities in the measured fiber using specialized devices.

SUMMARY

Described herein are systems and methods for calculating a relative temperature of a fiber-optic cable using bi-directional analysis traces with an optical time-domain reflectometer ("OTDR"). One embodiment of the disclosure of this application is related to a computer readable storage medium including a set of instructions that are executable by a processor. The set of instructions being operable to collect an initial set of measurement data at a first time interval and calculate a base local backscatter along a fiber, collect a subsequent set of measurement data at a second time interval and calculate a subsequent local backscatter along the fiber, determine a change in backscatter as a function of a difference between the base local backscatter and at least the subsequent backscatter along the fiber, and determine a relative temperature variation of the fiber as a function of the change in backscatter along the length of the fiber.

A further embodiment of the disclosure of this application is related to a system comprising at least one detector collecting an initial set of measurement data at a first time interval and calculate a base local backscatter along a fiber, and collecting a subsequent set of measurement data at a second time interval and calculate a subsequent local backscatter along the fiber. The system further comprising a processor determining a change in backscatter as a function of a difference between the base backscatter and at least the subsequent backscatter along the fiber, and determining a relative temperature variation of the fiber as a function of the change in backscatter along the length of the fiber.

DETAILED DESCRIPTION

The exemplary embodiments may be further understood with reference to the following description and the related appended drawings, wherein like elements are provided with the same reference numerals. The exemplary embodiments are related to systems and methods for calculating a relative temperature of a fiber-optic cable using bi-directional analysis traces with an optical time-domain reflectometer ("OTDR"). For instance, the exemplary embodiments are related to systems and methods for providing measurements of optical fiber from both ends of the fiber using an OTDR, or a pair of OTDRs.

The systems and methods described herein may calculate a relative temperature of a fiber, or portion of a fiber, through analyzing bi-directional traces taken with a standard OTDR, or a pair of standard OTDRs, without requiring any improvements or additional specialized components within the underlying hardware of the OTDR instrument. Measurements of relative temperatures of fiber optic cables may be used in any number of monitoring applications, such as for example, along gas pipelines and other crucial infrastructure components.

According to the exemplary embodiments, a standard OTDR may be used to determine a fiber's relative temperature. From a set of hi-directional OTDR traces, a user may calculate a back-scatter coefficient, $\eta(x)$, as a function of distance, x, down a fiber. This "local backscatter factor" may vary along the length of the fiber, and may also vary with temperature and stress. According to the exemplary embodiments described herein, the data from the OTDR traces may be properly aligned, wherein the local backscatter function may be calculated by taking an average of the backscatter power from both the forward and backward directions. The backscatter factor may depend primarily, but not exclusively, on both the mode-field diameter ("MFD") of the fiber and the Rayleigh backscattering parameter. An MFD reading may be defined as an expression of distribution of the irradiance, or the optical power per unit area, across a cleaved end face of a tested fiber. The MFD reading for a particular fiber may be held constant, having no variation over time. Also, the Rayleigh backscatter parameter may depend on material parameters that do not change once the fiber is fabricated. However, both the mode-field diameter and the Rayleigh backscattering parameter may change slightly as the temperature is varied. Thus, any changes in the backscatter factor may be attributed to changes in the temperature of the fiber.

An exemplary spatial correlation of the local backscatter coefficient, $\eta(x)$, is determined by the resolution of the OTDR used to measure the backscattered light. Thus, the resolution of the temperature determination is the same as the resolution of the OTDR.

In order to accurately characterize relative fiber temperature using this technique, traces are taken from each end of an optical fiber and then combined using a bi-directional analysis. Specifically, bi-directional traces may more accurately calculate the loss and backscatter function along the length of the fiber than what is calculated using a single trace. The backscatter function may be a function of various characteristics of a fiber such as, but not limited to, the fiber's mode field diameter, doping concentration, Rayleigh scatter coefficient, core diameter, etc. The dominant cause of longitudinal variation in the scaled local backscatter function is due to variations in the mode-field diameter. Bi-directional analyses may also be used to characterize local variations over time in both the structure and temperature along the length of the fiber.

By differentiating a difference between a forward trace down a fiber and a backward trace down the same fiber, the loss along the fiber length may be calculated using the following equation:

$$L(x) = \partial/\partial x (10 \cdot \log_{10} P_{backward} - 10 \cdot \log_{10} P_{forward})/2$$

According to this equation, $L(x)$ may be the loss as a function of distance along the fiber in units of dB/km, while $P_{back}$ and $P_{forward}$ may be the forward and back OTDR traces in linear units. $P_{backward}$ and $P_{forward}$ found by measuring the strength of the back-reflected light from each end of the fiber as a function of time. The time delay corresponds to the distance from the fiber end to the point along the length of the fiber where the light was reflected, and therefore, $P_{back}$ and $P_{forward}$ may be plotted as a function of fiber position.

The local loss $L(x)$ may be useful for locating and identifying problems with the installed fiber. The two pulses $P_{backward}$ and $P_{forward}$ may vary along the length of the fiber, and in the above equation the measurements are aligned, so that the measurements $P_{backward}$ and $P_{forward}$ correspond to the same points along the fiber to insure accurate results.

Bi-directional traces may be analyzed to provide information regarding the variation in the fiber structure. The local backscatter function can be calculated from the sum of the pulses using the following equation:

$$\eta(x) = (P_{backward} + 10 \cdot \log_{10} P_{forward})/2$$

The local backscatter function may be related to the local Rayleigh backscatter parameter by an additive constant. The additive constant may be determined by any one of: (1a) the sensitivity of the "forward" OTDR receiver, (2a) the power of the "forward" OTDR transmitter, (3a) the coupling loss of the "forward" OTDR in the receive direction, (4a) the coupling loss of the "forward" OTDR in the receive direction, (1b) the sensitivity of the "backward" OTDR receiver, (2b) the power of the "backward" OTDR transmitter, (3b) the coupling loss of the "backward" OTDR in the receive direction, (4b) the coupling loss of the "backward" OTDR in the receive direction, and (5) the total loss of the fiber.

Figure 3:
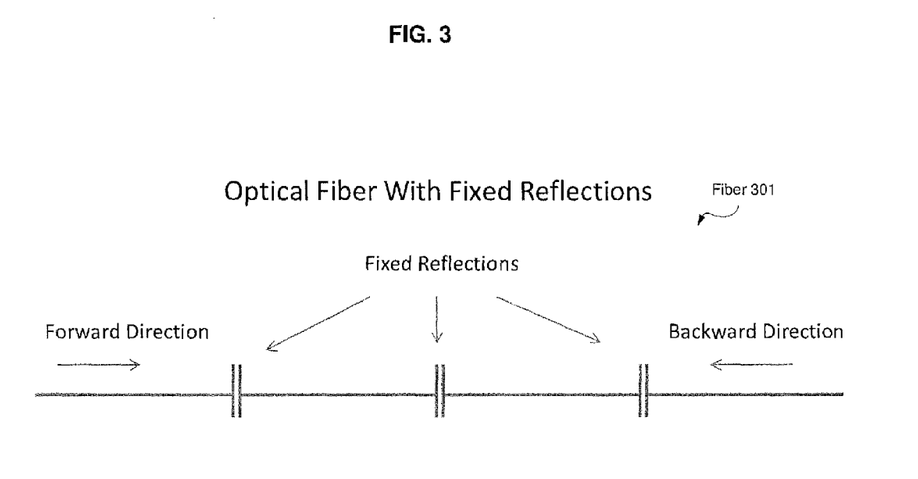
FIG. 3 shows an example of a fiber used as a sensor for determining temperature. The fiber should have one or more fixed reflections, and should be under constant stress (e.g., minimal stress).

Accordingly, changes in (1a) through (4a) may be tracked over time by observing changes in the values of any fixed reflections in the forward OTDR trace. Similarly, changes in (1b) through (4b) may be tracked over time by observing changes in the values of any fixed reflections in the backward OTDR trace. Fixed reflections may exist in an installed fiber resulting from airgaps in fusion splices, or from the use of mechanical splices. If a fiber is designed to be used as a probe, fixed reflections may be designed into the fiber for this purpose. For an example, see fiber 301 in FIG. 3.

Changes in (5), the total loss of the fiber, may be easily tracked my determining the total loss of all the fiber and splices from the bi-directional OTDR traces:

$$\text{Loss} = (\text{Loss}_{forward} + \text{Loss}_{backward})/2$$

In this way, the $\eta(x)$ determined at different times may be corrected for any changes (1a), (2a), 3a), (4a), (1b), (2b), (3b), (4b), and (5):

$$\eta_{scaled}(x) = \eta(x) - \frac{1}{2}(10 \cdot \log_{10} \Sigma P^f_i(\text{forward}) + 10 \cdot \log_{10} \Sigma P^b_i(\text{backward})) + \text{Loss}$$

Here, $P^f_i$ is the power reflected from the $i^{th}$ reflection, normalized to the origin in the forward direction using twice the roundtrip loss at the position of the reflection. Similarly, $P^b_i$ is the power reflected from the $i^{th}$ reflection, normalized to the origin in the backward direction using twice the roundtrip loss at the position of the reflection from the start of the backward direction. This scaling accounts for changes in coupling losses, sensitivities, of fiber loss between measurements. Remaining variations in $\eta_{scaled}(x)$ over time will be due to temperature changes.

For cabled fiber that was part of a single draw, the variations in the local Rayleigh backscatter parameter as a function of distance $(x)$ may be caused largely by variations in MFD $(\omega)$. In addition to MFD $(\omega)$, further fiber parameters may vary with distance $(x)$, such as for example, Glass Transition Temperature $(T_g)$, cladding index of refraction $(n)$, photoelastic coefficient $(p)$, and isothermal compressibility $(\beta)$. Of these parameters, only the Glass Transition Temperature $(T_g)$ may be expected to remain constant when the ambient temperature changes. It should be noted that the temperature may also vary locally as $T = T(x, \tau)$.

The local backscatter function may be a function of various characteristics of the fiber, such as, but not limited to, the capture ratio $(S)$, Rayleigh scatter coefficient $(\alpha_{Rayleigh})$ group velocity $(v_g)$, etc. Specifically, the backscatter coefficient may be related to fundamental fiber parameters as follows:

$$\eta = S P_{launch} \alpha_{Rayleigh} \tau v_g / 2$$

The capture ratio $(S)$ may be calculated as follows:

$$S = (NA)^2/4n^2 \approx (1/8n^2 n^2)(\lambda/\omega)^2$$

The Rayleigh scattering coefficient may be related to fiber material parameters as follows:

$$\alpha_{Rayleigh} = (8n^3/3\lambda^4) n^8 p^2 k T \beta$$

Based on the OTDR pulse, time-resolved output may be converted to power versus distance using the group velicity of light in glass $v_g$ as follows:

$$P_{backscatter}(x) = P_{launch} S \alpha_{Rayleigh}(v_g \tau/2) e^{-2\alpha_{total} x}$$

Using the above definitions, the local backscatter function may be re-written as follows:

$$\eta(x) = 10 \cdot \log_{10}(P_{launch}) + 10 \cdot \log_{10}(S \alpha_{Rayleigh}(v_g \tau/2)) - \text{Loss}_{total}$$

By making measurements at different times (e.g., at two separate times), any changes in S or $\alpha_{Rayleigh}$ may be determined as the temperature changes. However, $P_{launch}$ can change between measurements, as well as the total fiber loss L. In order to account for changes in $P_{launch}$ at different times, the integrated reflected power from the fixed reflectors may be measured, referred to either the forward end or the backward end of the fiber by correcting for transmission losses. Similarly, changes in fiber loss may be accounted for by simply measuring the total fiber loss using the bi-directional OTDR trace analysis. The resulting scaled local backscatter function is used to track temperature changes.

The scaled local backscatter information may be considered to be temperature-dependent and stress-dependent. Therefore, if the stress of the fiber is held constant, measurements of the scaled local backscatter function may be used to determine relative temperature changes.

The change in the scaled local backscatter function with temperature is determined by how S and $\alpha_{Rayleigh}$ depend on temperature. For a large temperature change, this dependence may be nonlinear and could be determined by calibration. Thus, a fiber intended to be used as a sensing element is first calibrated by measuring in the laboratory the scaled local backscatter function as a function of temperature.

For smaller temperature changes, the scaled local backscatter function will be approximately linear with temperature changes. According to an exemplary embodiment, a 1 degree change may correspond to a relative difference in scaled local backscatter function of about 0.001 dB. The measurement sensitivity may be improved by averaging over several fibers. Additional sensitivity may be gained by also averaging over several wavelengths, as the wavelength dependence of the backscatter function may cancel out when either the ratio is taken (e.g., in linear units) or the difference is take (e.g., in logarithmic units). Assuming a normal white noise, the measurement sensitivity may be increased with the square root of the number of averages taken.

Figure 1:
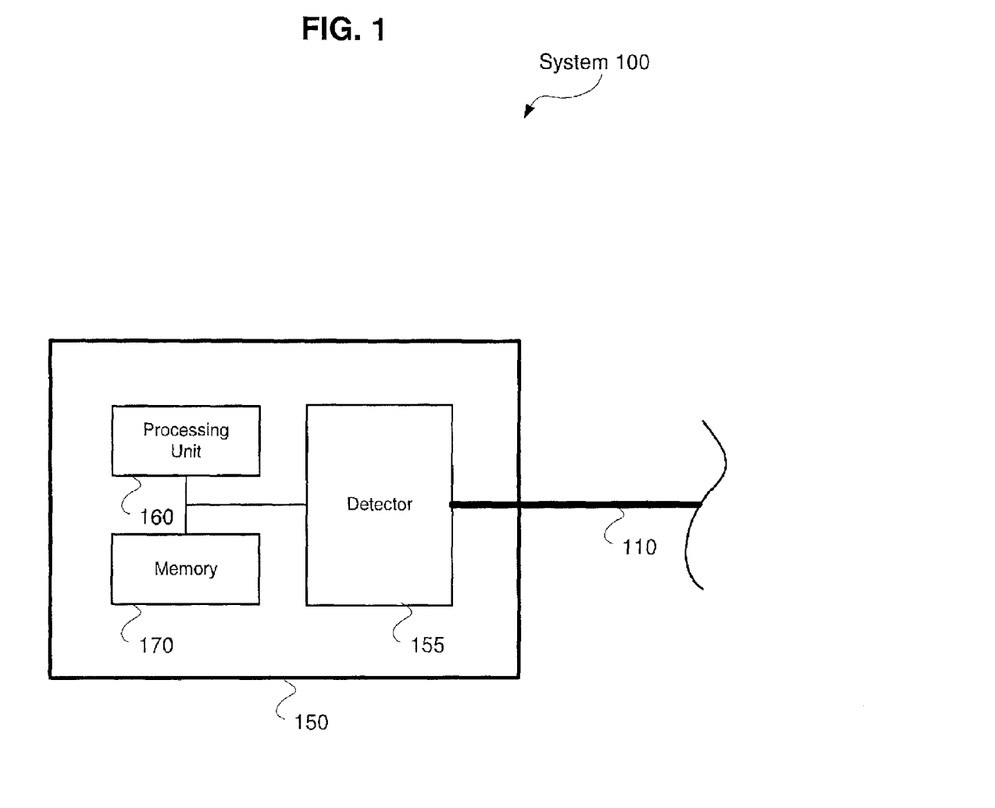
FIG. 1 shows an exemplary system for calculating a relative temperature of a fiber-optic cable using bi-directional analysis traces with an OTDR according to an exemplary embodiment.

FIG. 1 shows an exemplary system 100 for calculating a relative temperature of a fiber-optic cable using bi-directional analysis traces with an OTDR according to an exemplary embodiment. The exemplary system 100 may include an OTDR 150 having a detector 155 in communication with a processing unit 160 (e.g., a processor, multiprocessor, CPU, etc.) and a centralized data location or computer-readable storage medium, such as a memory 170. In addition to the detector 155, the OTDR 150 may include a light source (e.g., a semiconductor laser), a coupler, and/or a circulator. It should be noted that the processing unit 160 may perform a set of instructions related to the systems and methods described herein. Furthermore, the processing unit 160 may be in communication with the memory 170. Accordingly, each of the OTDR 150, the processing unit 160, and the memory 170 may be composed of various computer hardware or software components, or any combination thereof.

As will be described below, the processing unit 160 may analyze bi-directional traces take with the OTDR 150 and its detector 150 by a taking a small amount of additional data (e.g., scaled local backscatter readings) and calculating a relative temperature along the length of an exemplary fiber 110 (e.g., fiber under test). It should be noted that each of the processing unit 160 and the memory 170 may reside within the OTDR 150, itself. Alternatively, these components may reside in separate devices in communication with the OTDR 150. Furthermore, it should be noted that the system 100 is not limited to a particular set of components, and may include any number of components, either more or less than those illustrated in FIG. 1.

As noted above, the exemplary embodiments of the system 100 may utilize a standard optical time domain reflectometer, such as OTDR 150, to make relative temperature measurements along the fiber. These measurements may be accomplished without requiring any improvements or changes to the underlying hardware of the OTDR 150. Specifically, as will be described in greater detail below, two sets of bi-directional measurements may be taken of the exemplary fiber 110 at two different times in order to compute a change in local backscatter function between the two measurements. Accordingly, the relative dependence of the backscatter function on temperature may provide the user with a measurable variation in temperature along a portion of the fiber 110.

Figure 2:
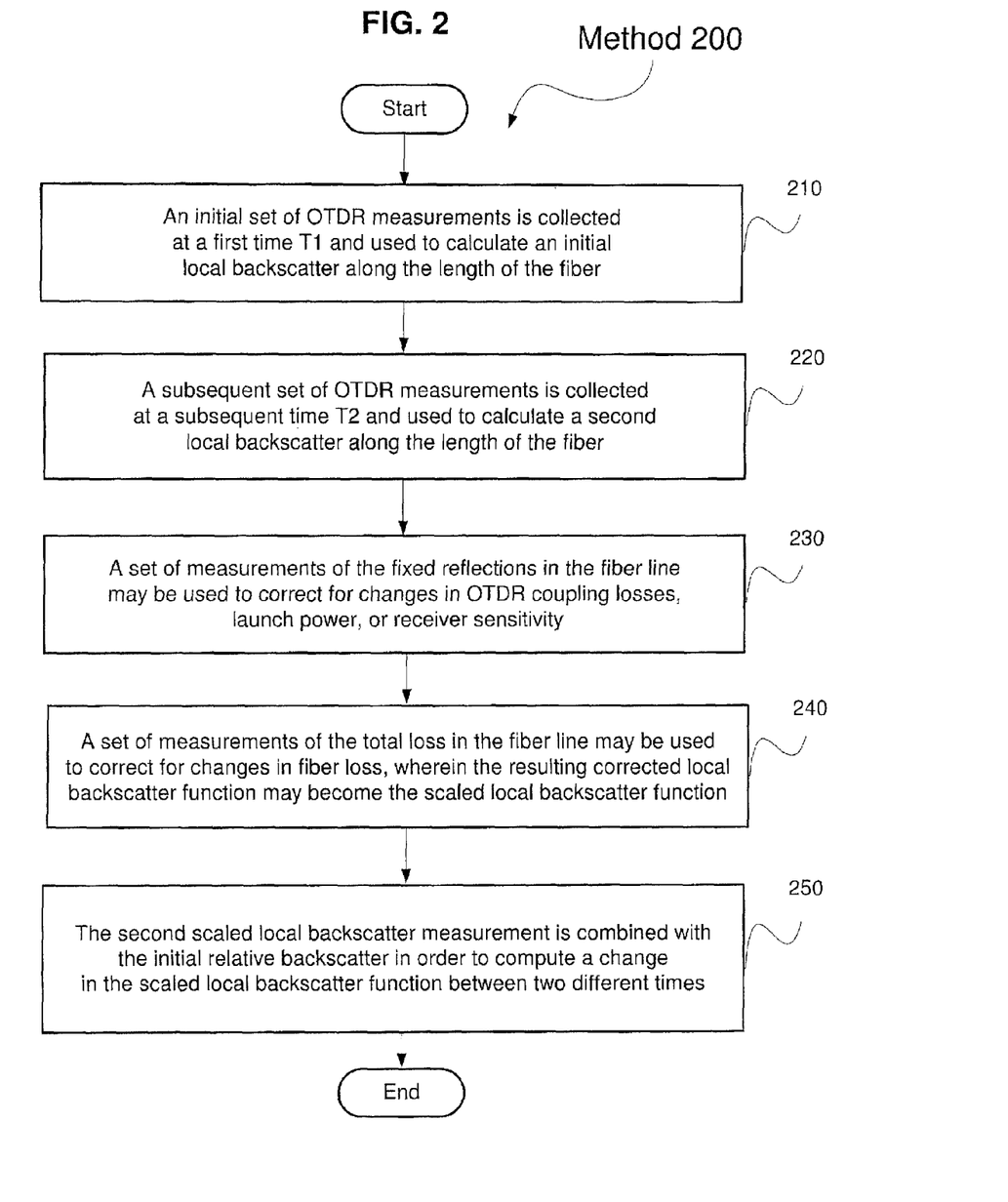
FIG. 2 shows an exemplary method for calculating a relative temperature of a fiber-optic cable using bi-directional analysis traces with an OTDR according to an exemplary embodiment.

FIG. 2 shows an exemplary method 200 for calculating a relative temperature of a fiber-optic cable 110 using bi-directional analysis traces with an OTDR 150 according to an exemplary embodiment. It should be noted that the steps in method 200 may be performed by the system 100 and the components described in FIG. 1.

In step 210 of the method 200, an initial set of OTDR measurements may be collected at a first time T1 and used to calculate an initial local backscatter along the length of the fiber 110. It should be noted that the term collect may refer to retrieving measurement data from a current OTDR trace or pulse, or to retrieving measurement data from the memory 170. For example, the memory 170 may store measurement data from a previous OTDR trace.

Due to the fact the MFD, and hence the scaled local backscatter, may vary slowly along the length of the fiber 110, this initial set of measurement data may be made at a lower resolution than may be desirable when characterizing the loss along the fiber length. By using a lower resolution, a longer optical pulse may be used, thereby increasing the optical power launched. Accordingly, the SNR of the OTDR 150 is improved.

In step 220 of the method 200, a subsequent set of OTDR measurements may be collected at a subsequent time T2 and used to calculate a second scaled local backscatter along the length of the fiber 110.

In step 230 of the method 200, a set of measurements of the fixed reflections in the fiber line is used to correct for changes in OTDR coupling losses, launch power, or receiver sensitivity.

In step 240 of the method 200, a set of measurements of the total loss in the fiber line is used to correct for changes in fiber loss. The resulting corrected local backscatter function is the scaled local backscatter function.

In step 250 of the method 200, the second scaled local backscatter measurement, in combination with the initial scaled local backscatter, may be used to compute a change in the scaled local backscatter function between two different times. For instance:

$$\Delta\eta_{scaled} = \eta_{scaled}(x,t) - \eta_{scaled}(x,0)$$

This function may provide the relative dependence of T(x), and may be measurable as follow for small temperature changes:

$$\Delta T(x) = C\Delta\eta_{scaled}(x)$$

Here, C is a linear calibration factor that may be determined in advance.

For larger temperature changes, the temperature change may be determined from a calibration function:

$$\Delta T(x) = C(\Delta\eta_{scaled}(x))$$

Here, C(f) is a nonlinear calibration factor that may be determined in advance.

It should be noted that due to the fact that the scaled local backscatter function may be considered consistent over time, steps 220 through 250 may be performed at any period of time, such as, for example, a time long after the performance of step 210. Furthermore, it should be noted that the subsequent measurement performed in step 220 may be performed repeatedly, for any number of times for any set periods of time (e.g., monthly). Accordingly, local temperature variations may be found from repeated bi-directional OTDR traces.

Additional measurement data may be collected for a plurality of additional fibers that are "co-located" with the original fiber (e.g., within the same cable as the original fiber). Accordingly, the method 200 may calculate additional base scaled local backscatter along the plurality of these additional fibers. As described above, a subsequent set of measurement data at a second time interval may be collected in order to calculate a subsequent scaled local backscatter along this plurality of co-located fibers. A change in scaled local backscatter may be determined as a function of a difference between the base scaled local backscatter. Accordingly, the subsequent scaled local backscatter may be determined along the plurality of additional fibers. A relative temperature variation of the plurality of additional fibers may also be determined as a function of the change in scaled local backscatter of the plurality of additional fibers.

Figure 4:
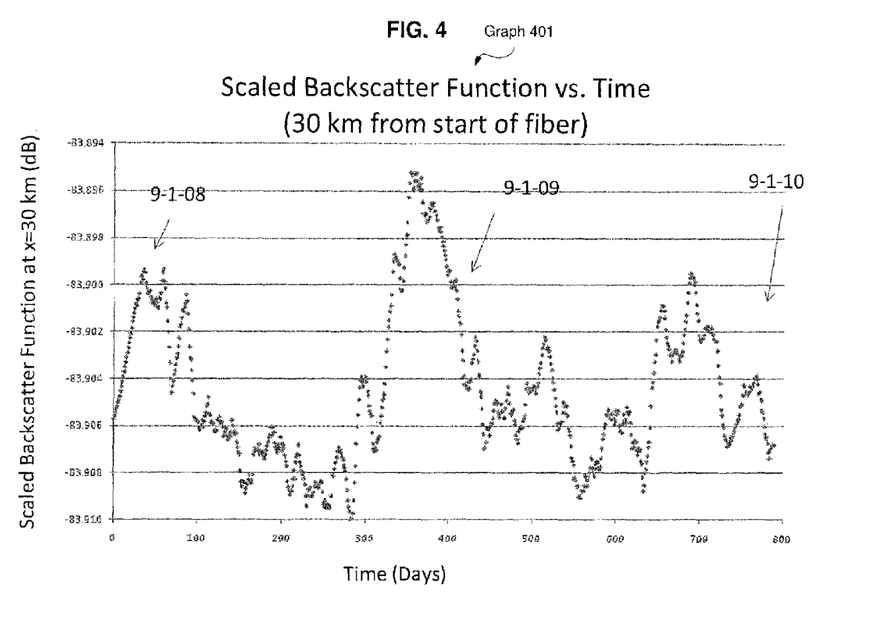
FIG. 4 shows a graph of measurements of the scaled backscatter function as a function of time at a point 30 km from the end of the fiber.

FIG. 4 shows a graph 401 of measurements of the scaled local backscatter function, $\eta_{scaled}(x)$, at a particular distance x=30 km along a length of a fiber-optic cable 110 as a function of time, according to the exemplary embodiments described herein. Local temperature variations may be found from repeated bi-directional traces from the exemplary OTDR 150. Accordingly, a log scale of changes in the backscatter factor may be attributed to changes in the temperature of the fiber 110. As noted above, for small enough temperature changes the changes in scaled local backscatter function will be linear with temperature changes. In the FIG. 4, results are given for an average of 10 fibers over nearly three years. It is evident from the figure that the scaled local backscatter function is highest in the summer months.

It should be noted that the scaled local backscatter factor, $\eta_{scaled}(x)$, may be determined for each continuous fiber that originated in a single draw from the OTDR 150. According to the example illustrated in graph 401, there were segments from 13 draws for each of the 10 fibers on the exemplary route.

Figure 5:
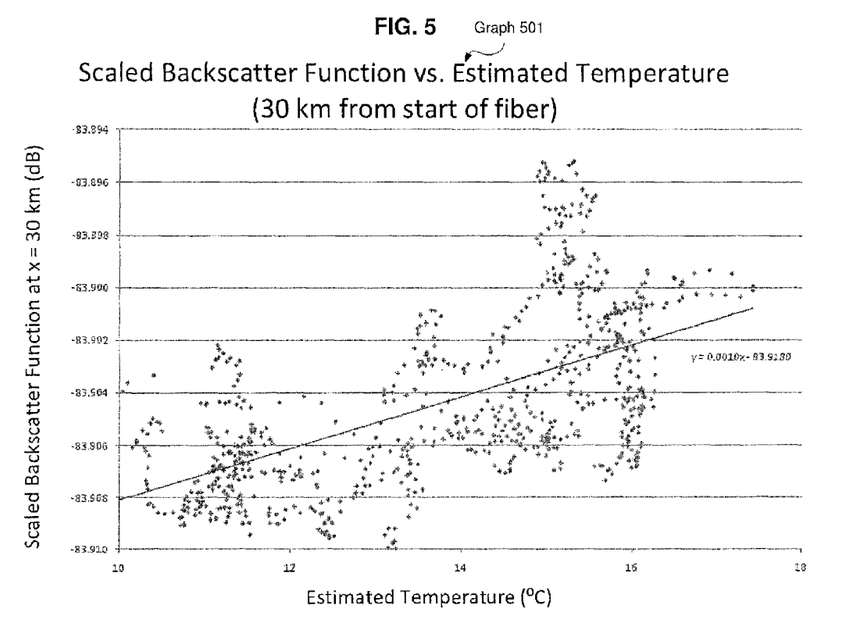
FIG. 5 shows a graph depicting the scaled backscatter function as a function of the estimated fiber temperature at a point 30 km from the end of the fiber.

FIG. 5 shows a graph 501 of measurements of the scaled local backscatter function, $\eta_{scaled}(x)$ at a point x=30 km from the forward origin, averaged over 10 fibers, as a function of the estimated local temperature. The fiber at this location is 4 feet under the ground surface, in a conduit. The temperature was estimated by using Weather Bureau records of surface temperature and an appropriate thermal model of the ground to calculate the temperature 4 feet below the surface. Although there is a lot of variation in the data, there is a clear correlation between scaled local backscatter function and temperature. The linear fit gives a calibration factor of 0.001 dB/° C.

As depicted in the graph 501, the scaled local backscatter factor as a function of time is given for a specific location x=30 km from the origin. The same measurement gives equivalent results for each distance from the origin, x, in kilometers (km) (e.g., from 0 km to 35 km). For each of the readings, bi-directional traces from the OTDR 150 may be used at a predetermined resolution setting, such as at 100 m resolution. Furthermore, multiple fibers may be traced during each of the readings, and multiple wavelengths may be implemented during the traces. For example, each reading may be for a predetermined number of fibers such as a set of six fibers using two wavelengths. Accordingly, $\eta_{scaled}(x)$ may be calculated for each set of traces at the different wavelengths and then the average value may be placed in the graph 401 as a function of distance.

It will be apparent to those skilled in the art that various modifications may be made in the described embodiments, without departing from the spirit or the scope of the application. Thus, it is intended that the present disclosure covers modifications and variations of this application provided they come within the scope of the appended claimed and their equivalents.

What is claimed is:

1. A computer-readable storage medium including a set of instructions executable by a processor, the set of instructions, when executed by the processor, causing the processor to perform operations comprising:
    determining a base scaled local backscatter along a fiber for a first time interval based on an initial set of measurement data;
    determining a subsequent scaled local backscatter along the fiber for a second time interval based on a subsequent set of measurement data;
    determining a change in scaled local backscatter as a function of a difference between the base scaled local backscatter and the subsequent scaled local backscatter; and
    determining a temperature variation of the fiber as a function of the change in scaled local backscatter.

2. The computer-readable storage medium of claim 1, wherein the operations further comprise:
    determining an additional scaled local backscatter along the fiber for a third time interval.

3. The computer-readable storage medium of claim 1, wherein determining the base scaled local backscatter comprises:
    collecting the initial set of measurement data;
    determining a local backscatter by averaging a forward scatter power of the initial set of measurement data with a backward scatter power of the initial set of measurement data; and
    scaling the local backscatter using measurements of the total reflection and total loss of the fiber to determine the base scaled local backscatter.

4. The computer-readable storage medium of claim 1, wherein the operations further comprise:
    determining a further base scaled local backscatter along a plurality of further fibers for the first time interval, the plurality of further fibers being collocated with the fiber;
    determining a further subsequent scaled local backscatter along the plurality of further fibers for the second time interval;
    determining a further change in scaled local backscatter as a function of a difference between the further base scaled local backscatter and the further subsequent scaled local backscatter; and
    determining a relative temperature variation of the plurality of further fibers as a function of the further change in scaled local backscatter.

5. The computer-readable storage medium of claim 4, wherein determining the further base scaled local backscatter comprises:
    collecting a further initial set of measurement data for the plurality of fibers;
    determining a further local backscatter by averaging a forward scatter power of the further initial set of measurement data with a backward scatter power of the further initial set of measurement data; and scaling the local backscatter using measurements of the total reflection and total loss of the plurality of fibers to determine the base scaled local backscatter.

6. The computer-readable storage medium of claim 1, wherein the initial set of measurement data is a trace $P_{back}$, and wherein the subsequent set of measurement data is a trace $P_{forward}$, and wherein a scaled local backscatter function is:

$$\eta_{scaled}(x)=\eta(x)-\frac{1}{2}(10\cdot\log_{10}\Sigma P^f_i(\text{forward})+10\cdot\log_{10}\Sigma P^b_i(\text{backward}))+\text{Loss},$$

where $$\eta(x)=(10\cdot\log_{10}p_{back}+10\cdot\log_{10}p_{forward})/2.$$

7. The computer-readable storage medium of claim 1, wherein the initial set of measurement data and the subsequent set of measurement data are collected using bi-directional traces along a segment of the fiber.

8. The computer-readable storage medium of claim 1, wherein the initial set of measurement data and the subsequent set of measurement data are collected using an optical time-domain reflectometer.

9. The computer-readable storage medium of claim 1, wherein the change in scaled local backscatter is in linear units, and wherein a relationship between a scaled local backscatter coefficient and at least one fiber parameter is: $\eta_{scaled}$ which is proporational to: $SP_{launch}\,\alpha\text{Rayleigh}\,\tau Vg/2$.

10. The computer-readable storage medium of claim 1, wherein the subsequent set of measurement data is collected using a process including one of averaging subsequent scaled local backscatter readings along an additional fiber and averaging subsequent scaled local backscatter readings measured at different wavelengths.

11. A system, comprising:
a memory; and
a processor determining a base scaled local backscatter along a fiber for a first time interval based on an initial set of measurement data, determining a subsequent scaled local backscatter along the fiber for a second time interval based on a subsequent set of measurement data, determining a change in scaled local backscatter as a function of a difference between the base scaled local backscatter and the subsequent scaled local backscatter, and determining a temperature variation of the fiber as a function of the change in scaled local backscatter.

12. The system of claim 11, wherein the processor determines an additional scaled local backscatter along the fiber for a third time interval.

13. The system of claim 11, further comprising:
a collector collecting the initial set of measurement data and the subsequent set of measurement data.

14. The system of claim 11, wherein the processor determines the base scaled local backscatter by determining a local backscatter by averaging a forward scatter power of the initial set of measurement data with a backward scatter power of the initial set of measurement data, and scaling the local backscatter using measurements of the total reflection and total loss of the fiber to determine the base scaled local backscatter.

15. The system of claim 11, wherein the processor additionally determines a further base scaled local backscatter along a plurality of further fibers for the first time interval, the plurality of further fibers being collocated with the fiber, determines a further subsequent scaled local backscatter along the plurality of further fibers for the second time interval, determines a further change in scaled local backscatter as a function of a difference between the further base scaled local backscatter and the further subsequent scaled local backscatter, and determines a relative temperature variation of the plurality of further fibers as a function of the further change in scaled local backscatter.

16. The system of claim 14, further comprising:
a collector collecting a further initial set of measurement data for the plurality of fibers,
wherein the processor determines the further base scaled local backscatter by determining a further local backscatter by averaging a forward scatter power of the further initial set of measurement data with a backward scatter power of the further initial set of measurement data, and scaling the local backscatter using measurements of the total reflection and total loss of the plurality of fibers to determine the base scaled local backscatter.

17. The system of claim 11, wherein the initial set of measurement data is a trace $P_{back}$, and wherein the subsequent set of measurement data is a trace $P_{forward}$, and wherein a scaled local backscatter function is:

$$\eta_{scaled}(x)=\eta(x)-\frac{1}{2}(10\cdot\log_{10}\Sigma P^f_i(\text{forward})+10\cdot\log_{10}\Sigma P^b_i(\text{backward}))+\text{Loss},$$

where $$\eta(x)=(10\cdot\log_{10}p_{back}+10\cdot\log_{10}p_{forward})/2.$$

18. The system of claim 11, wherein the initial set of measurement data and the subsequent set of measurement data are collected using bi-directional traces along a segment of the fiber.

19. The system of claim 11, wherein the initial set of measurement data and the subsequent set of measurement data are collected using an optical time-domain reflectometer.

20. The system of claim 11, wherein the change in scaled local backscatter is in linear units, and wherein a relationship between a scaled local backscatter coefficient and at least one fiber parameter is:
$\eta_{scaled}$ which is proporational to: $SP_{launch}\,\alpha_{Rayleigh}\,\tau v_g/2$.

21. The system of claim 11, further comprising:
a collector collecting the subsequent set of measurement data,
wherein the collector collects the subsequent set of measurement data using a process including one of averaging subsequent scaled local backscatter readings along an additional fiber and averaging subsequent scaled local backscatter readings measured at different wavelengths.

* * * * *